United States Patent
Nash et al.

(10) Patent No.: US 9,232,119 B2
(45) Date of Patent: Jan. 5, 2016

(54) INTEGRATING IMAGE FRAMES (71) Applicant: RAYTHEON COMPANY, Waltham, MA (US)

(72) Inventors: Stephen R. Nash, Los Angeles, CA (US); Christopher A. Leddy, Huntington Beach, CA (US); Hoang K. Do, Fountain Valley, CA (US)

(73) Assignee: Raytheon Company, Waltham, MA (US)

( * ) Notice: Subject to any disclaimer, the term of this patent is extended or adjusted under 35 U.S.C. 154(b) by 89 days.

(21) Appl. No.: 14/048,898

(22) Filed: Oct. 8, 2013

(65) Prior Publication Data

US 2015/0097975 A1  Apr. 9, 2015

(51) Int. Cl.
*H04N 5/228* (2006.01)
*H04N 5/217* (2011.01)
*G06T 5/00* (2006.01)
*G06T 5/50* (2006.01)
*H04N 5/232* (2006.01)

(52) U.S. Cl.
CPC ............... *H04N 5/217* (2013.01); *G06T 5/002* (2013.01); *G06T 5/003* (2013.01); *G06T 5/50* (2013.01); *H04N 5/23203* (2013.01); *H04N 5/23254* (2013.01); *H04N 5/23277* (2013.01); *G06T 2207/20201* (2013.01)

(58) Field of Classification Search
CPC ..................... H04N 5/217; G06T 2207/20201; G06T 5/003
See application file for complete search history.

(56) References Cited

U.S. PATENT DOCUMENTS

| 4,679,086 A | 7/1987 | May |
| 8,374,453 B2* | 2/2013 | Lam et al. ..................... 382/254 |
| 2004/0252199 A1 | 12/2004 | Cheung et al. |
| 2010/0157079 A1 | 6/2010 | Atanassov et al. |
| 2012/0114235 A1* | 5/2012 | Lam et al. ..................... 382/167 |

FOREIGN PATENT DOCUMENTS

| EP | 0648398 B1 | 5/1999 |
| EP | 2063390 A1 | 5/2009 |
| EP | 2400740 A2 | 10/2012 |
| WO | 2008136771 A1 | 11/2008 |
| WO | 2011019461 A1 | 2/2011 |

* cited by examiner

*Primary Examiner* — Gary C Vieaux
(74) *Attorney, Agent, or Firm* — Burns & Levinson LLP; Joseph M. Maraia (57) ABSTRACT

A method for integrating image frames includes receiving for each pixel in at least one image frame a value representative of a sensor measurement. The method includes calculating an average difference of the value representative of the sensor measurement over a subset of the plurality of image frames. The method includes detecting motion in at least one pixel of the image frame in the plurality of image frames based on the calculated average difference of the value representative of the sensor measurement over the subset of the plurality of image frames. The method also includes generating an integrated image frame wherein each pixel having detected motion is integrated by an amount less than that of those pixels for which motion is not detected. The amount of frame integration is based on contrast levels, expected rates of motion, and noise characteristics of sensor input image data.

21 Claims, 10 Drawing Sheets

INTEGRATING IMAGE FRAMES

GOVERNMENT SUPPORT

The invention was supported, in whole or in part, by Government Contract No.: N00019-10-G-0006 Delivery Order 0020 from the Department of Defense. The Government has certain rights in the invention.

BACKGROUND

Generally, the display of images is degraded by motion blur and noise. Prior attempts at image frame integration reduce noise and increase sensor performance. However, the prior attempts at image frame integration are often degraded by motion blur and noise. Thus, a need exists in the art for improved image frame integration.

SUMMARY

One approach to integrating image frames is a method that can be executed by one or more processors. The method includes receiving for each pixel in at least one image frame a value representative of a sensor measurement. The method also includes calculating an average difference of the value representative of the sensor measurement over a subset of the plurality of image frames. The method further includes detecting motion in at least one pixel of the image frame in the plurality of image frames based on the calculated average difference of the value representative of the sensor measurement over the subset of the plurality of image frames. The detected motion is of an object captured in the plurality of image frames. In addition, the method includes generating an integrated image frame wherein each pixel having detected motion is integrated by an amount less than that of those pixels for which motion is not detected. The amount of frame integration is based on contrast levels, expected rates of motion, and noise characteristics of sensor input image data.

In an example, calculating the average difference includes normalizing a difference of the value representative of the sensor measurement of a pixel of the plurality of image frames by performing a mean absolute deviation calculation of at least one pixel between at least two image frames of the plurality of image frames. The method can include detecting motion by detecting initial motion in the at least one pixel of the image frame in the plurality of image frames if the average difference is greater than a scale factor times the average difference and the average difference is greater than a noise threshold.

The scale factor can be based on a statistical dispersion of data resulting from normalizing the difference of the value representative of the sensor measurement of a pixel of the plurality of image frames and sensor noise, registration accuracy, and changes in the image from frame-to-frame such as rotation, scale and perspective. The noise threshold can be based on measured image noise and a type of sensor providing the sensor measurement.

The method can further include assigning a persistence count for each of the at least one pixel of the image frame for which initial motion is detected. The persistent count can be based on a typical vehicle size and speed, and a range of an image sensor to a target. The method can also include reducing false detections of motions by applying a noise filter to each of the at least one pixel of the image frame for which motion is detected. Additionally, the method can include applying a morphological spreading filter to those pixels for which motion is still detected. The method can also include thresholding the output of the morphological spreading filter, where the thresholding provides a final identification of motion in the at least one pixel of the image frame in the plurality of image frames.

Another approach to integrating image frames is a system. The system includes a memory and one or more processors. The system also includes an image integration processor. The image integration processor, using the one or more processors, is configured to receive for each pixel in at least one image frame a value representative of a sensor measurement. The image integration processor, using the one or more processors, is configured to calculate an average difference of the value representative of the sensor measurement over a subset of the plurality of image frames. The image integration processor, using the one or more processors, is also configured to detect motion in at least one pixel of the image frame in the plurality of image frames based on the calculated average difference of the value representative of the sensor measurement over the subset of the plurality of image frames. The detected motion is of an object captured in the plurality of image frames. In addition, the image integration processor, using the one or more processors, is configured to generate an integrated image frame wherein each pixel having detected motion is integrated by an amount less than that of those pixels for which motion is not detected, wherein the amount of frame integration is based on contrast levels, expected rates of motion, and noise characteristics of sensor input image data.

The image integration module, using the one or more processors, can be further configured to calculate the average difference by normalizing a difference of the value representative of the sensor measurement of a pixel of the plurality of image frames by performing a mean absolute deviation calculation of at least one pixel between at least two image frames of the plurality of image frames.

The image integration module, using the one or more processors, can be further configured to detect initial motion in the at least one pixel of the image frame in the plurality of image frames if the average difference is greater than a scale factor times the average difference and the average difference is greater than a noise threshold. The scale factor can be based on a statistical dispersion of data resulting from normalizing the difference of the value representative of the sensor measurement of a pixel of the plurality of image frames and sensor noise, registration accuracy, and changes in the image from frame-to-frame such as rotation, scale and perspective. The noise threshold can be based on measured image noise and a type of sensor providing the sensor measurement.

The image integration module, using the one or more processors, can also be configured to assign a persistence count for each of the at least one pixel of the image frame for which initial motion is detected. The persistent count can be based on a typical vehicle size and speed, and a range of an image sensor to a target.

The image integration module, using the one or more processors, can be further configured to reduce false detections of motions by applying a noise filter to each of the at least one pixel of the image frame for which motion is detected. The image integration module, using the one or more processors, can also be configured to applying a morphological spreading filter to those pixels for which motion is still detected.

Further, the image integration module, using the one or more processors, can be further configured to threshold the output of the morphological spreading filter, wherein results of the threshold provide a final identification of motion in the at least one pixel of the image frame in the plurality of image frames.

Another approach to integrating image frames is a non-transitory computer readable medium. The non-transitory computer-readable medium has computer readable program codes embodied thereon for integrating image frames, the computer readable programs codes, including instructions that, when executed by one or more processors, cause the processor to receive for each pixel in at least one image frame a value representative of a sensor measurement. The instructions also cause the processor to calculate an average difference of the value representative of the sensor measurement over a subset of the plurality of image frames. Further, the instructions cause the processor to detect motion in at least one pixel of the image frame in the plurality of image frames based on the calculated average difference of the value representative of the sensor measurement over the subset of the plurality of image frames. The detected motion is of an object captured in the plurality of image frames. Additionally, the instructions cause the processor to generate an integrated image frame wherein each pixel having detected motion is integrated by an amount less than that of those pixels for which motion is not detected. The amount of frame integration is based on contrast levels, expected rates of motion, and noise characteristics of sensor input image data.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
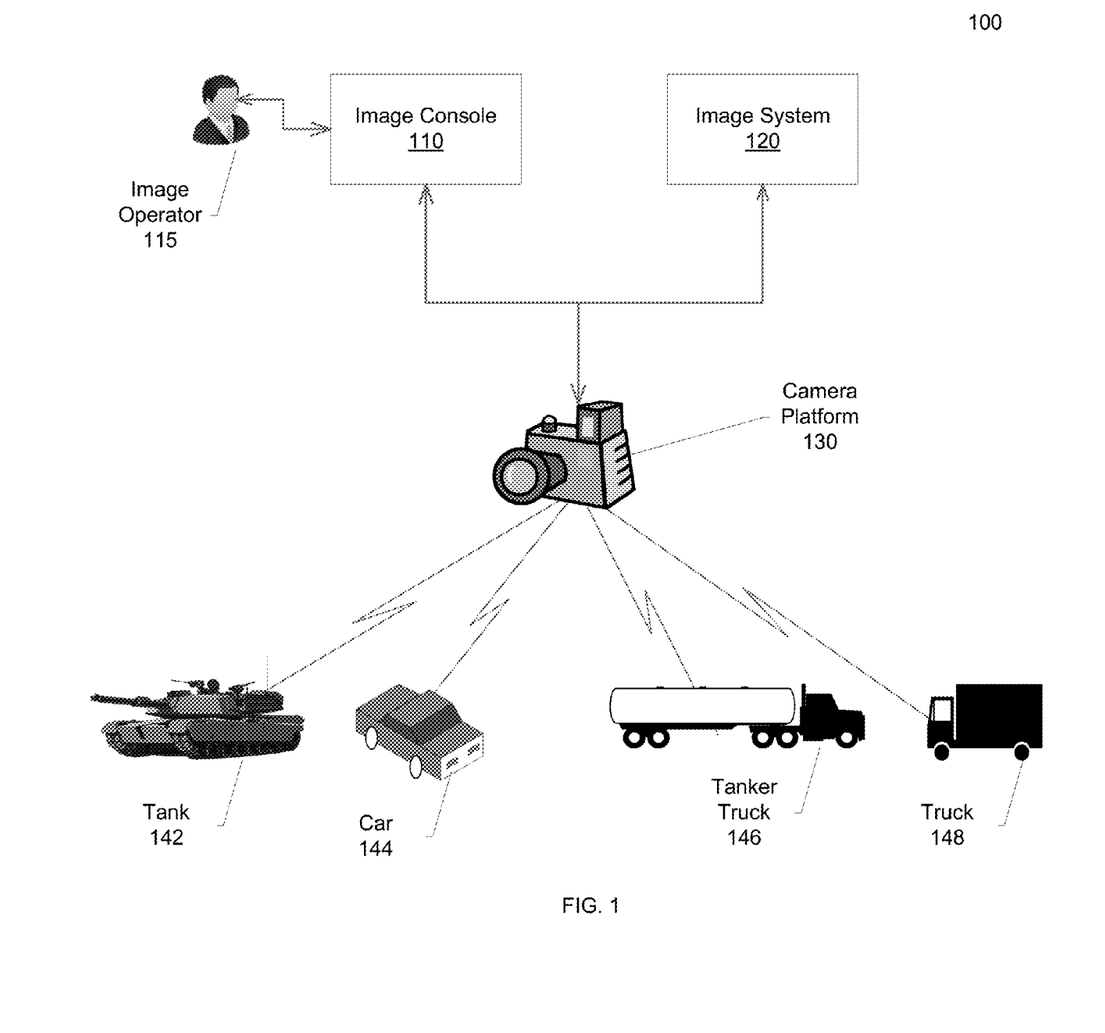
FIG. 1 is a diagram of an exemplary image acquisition environment in accordance with an example embodiment of the present disclosure.

FIG. 1 is a diagram of an exemplary image acquisition environment 100. The environment 100 includes an image console 110, an image system 120, and a camera platform 130. An image operator 115 views a plurality of objects utilizing the image console 110. The plurality of objects includes a tank 132, a car 134, a tanker trailer 136, and a truck 138. The camera platform 130 (e.g., optical camera platform, infrared camera platform, etc.) receives optical waves, infrared waves, and/or any other type of waveform to form an image of one or more of the plurality of objects. The camera platform 130 communicates data (e.g., digital representation of an image of the tank 132, optical representation of an image of the car 134, etc.) to the image system 120.

The image system 120 analyzes the received video and/or image frames to integrate the image frames (e.g., a single snapshot of the image at a specified time, a sub-part of the image, etc.). For example, a one second video of an object includes ten image frames of the object. In this example, the image system 120 integrates the ten image frames to form an integrated image frame with enhanced resolution of the object. The image system 120 can store the integrated image for further analysis and/or transmit the integrated image to the image console 110 for viewing and/or analysis by the image operator 115.

Although FIG. 1 illustrates a single camera platform 130, the environment 100 can utilize any number of camera platforms (e.g., ten camera platforms, one hundred camera platforms, etc.). For example, the image system 120 can receive images from any number of camera platforms for the same object or different objects (as illustrated in Table 1). In other examples, the single camera platform 130 can include a plurality of cameras and/or other types of image capture devices (e.g., motion sensor, environmental sensor, heat sensor, etc.).

Table 1 illustrates exemplary image information received by a plurality of camera platforms and transmitted to the image system 120.

TABLE 1

Exemplary Image Information

| Image | Object | Camera | Time |
| --- | --- | --- | --- |
| A34 | Tank 142 | Airplane BZ | 03:32.21 |
| A35 | Tank 142 | Airplane BZ | 03:32.22 |
| B34 | Tank 142 | Border Wall RT | 03:32.22 |
| C56 | Tank 142 | Command Carrier GH | 03:32.21 |
| D32 | Tank 142 | Satellite CB | 03:32.20 |

Figure 2:
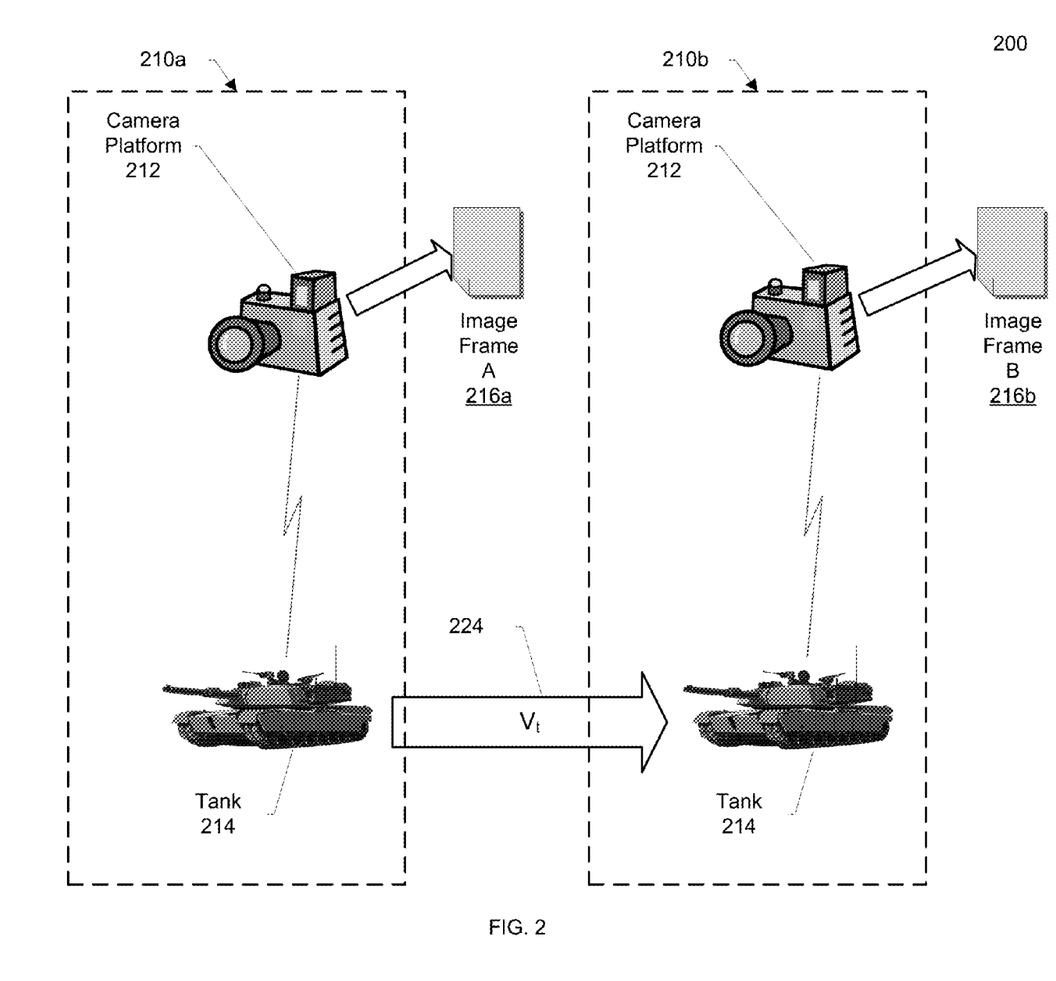
FIG. 2 is a diagram of another exemplary image acquisition environment in accordance with an example embodiment of the present disclosure.

FIG. 2 is a diagram of another exemplary image acquisition environment 200. The image acquisition environment 200 illustrates images at two time frames A 210a and B 210b. At time A 210a, a camera platform 212 and a tank 214 are at a first position (e.g., the physical location of the camera platform 212 is in square 3×4 and the physical location of the tank 214 is in square 3×8), and the camera platform 212 receives an image frame A 216a of the tank 214. At time B 210b, the camera platform 212 and the tank 214 are at a second position (e.g., the physical location of the camera platform 212 is in square 3×4 and the physical location of the tank 214 is in square 9×8), and the camera platform 212 receives an image frame B 216b of the tank 214. During the time period between time A 210a and time B 210b, the tank 214 moved from the first position to the second position at a velocity $V_t$ 224. The camera platform 212 can transmit the image frames A 216a and B 216*b* to an image system (not shown) for processing (e.g., integration of the image frames into an integrated image frame).

Table 2 illustrates exemplary image information received by the camera platform 212.

TABLE 2

Exemplary Image Information

| Image | Object | Camera | Time |
|---|---|---|---|
| Image Frame A 216a | Tank 214 | Camera Platform 212 | 05:32.21 (Time A 210a) |
| Image Frame B 216b | Tank 214 | Camera Platform 212 | 05:32.22 (Time B 210b) |
| Image Frame C | Tank 214 | Camera Platform 212 | 05:32.23 |
| Image Frame D | Tank 214 | Camera Platform 212 | 05:32.24 |

Figure 3:
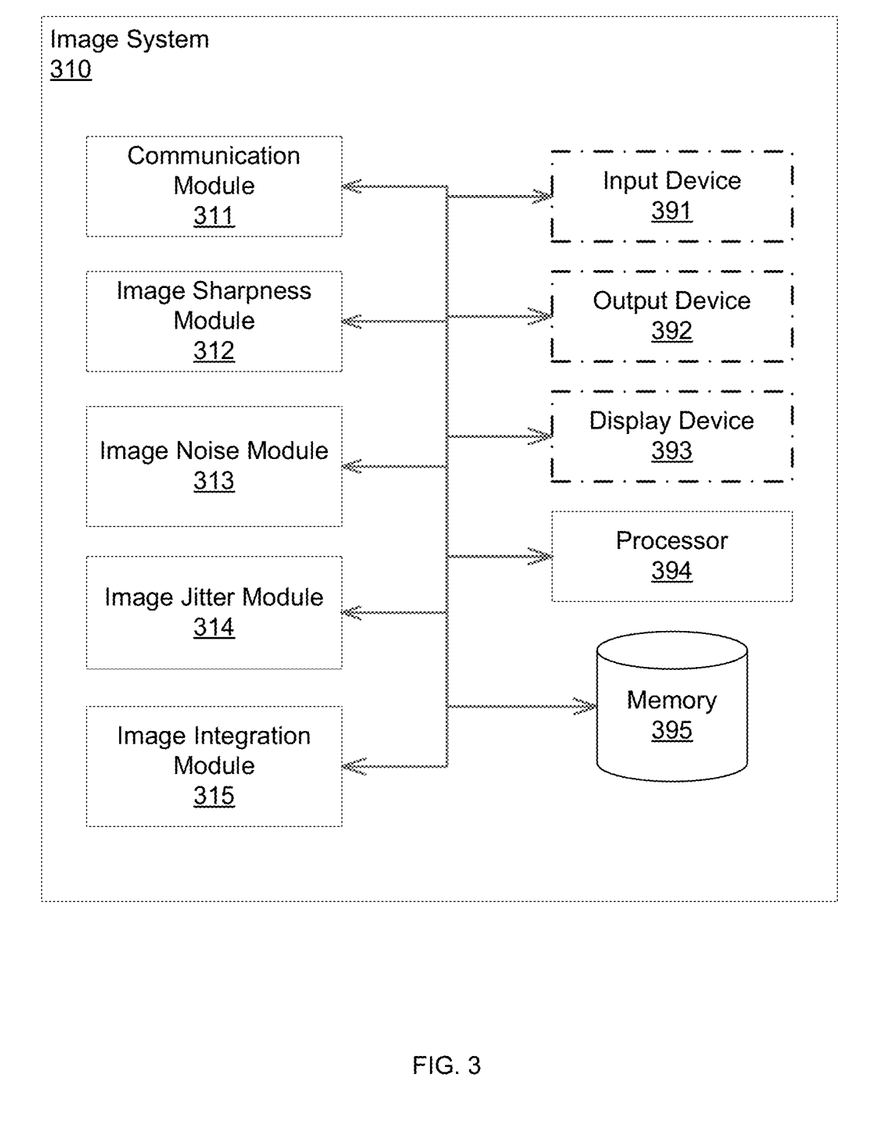
FIG. 3 is a block diagram of an exemplary image system in accordance with an example embodiment of the present disclosure.

FIG. 3 is a block diagram of an exemplary image system 310. The image system 310 includes a communication module 311, an image sharpness module 312, an image noise module 313, an image jitter module 314, an image integration module 315, an input device 391, an output device 392, a display device 393, a processor 394, and a storage device 395. The modules and devices described herein can, for example, utilize the processor 394 to execute computer executable instructions and/or include a processor to execute computer executable instructions (e.g., an encryption processing unit, a field programmable gate array processing unit, etc.). It should be understood that the image system 310 can include, for example, other modules, devices, and/or processors known in the art and/or varieties of the illustrated modules, devices, and/or processors.

The communication module 311 receives the images (e.g., from a camera platform, from an intermediate image processing device, from a storage device, etc.). The communication module 311 communicates information to/from the image system 310. The communication module 311 can receive, for example, information associated with a camera platform. The information associated with the camera platform can be associated with a data signal (e.g., data signal from a camera platform, processed data signal from a camera platform, data signal from a motion sensor, data signal from a global positioning system, data signal from a location system, etc.).

The image sharpness module 312 determines a sharpness metric for each image frame in a plurality of image frames. The sharpness metric is indicative of at least one of edge content and an edge size of the image frame.

In other examples, the image sharpness module 312 separates one or more horizontal edge components (e.g., a row within the image frame, set of rows within the image frame, etc.) and one or more vertical edge components (e.g., a column within the image frame, set of columns within the image frame, etc.) in each image frame in the plurality of image frames. In some examples, the image sharpness module 312 interpolate the one or more horizontal components and the one or more vertical components for each image frame in the plurality of image frames (e.g., to achieve sub-pixel alignment, to maximize sub-pixel alignment, etc.). In other examples, the image sharpness module 312 correlates the interpolated horizontal and vertical components to determine a pixel shift for each image frame in the plurality of image frames. The pixel shift is indicative of at least one of the edge content and the edge size (e.g., number of edges, size of edges, etc.) of the respective image frame. The pixel shift can be, for example, utilized by the image sharpness module 312 to generate an edge map for each image frame.

In some examples, the image sharpness module 312 generates an edge map for each image frame in the plurality of image frames. The edge map includes pixel values indicative of an edge and a non-edge. In other examples, the image sharpness module 312 combines the pixel values in the edge map for each image frame in the plurality of image frames to form the sharpness metric.

In other examples, the image sharpness module 312 utilizes an edge detector/extractor (e.g., Sobel detector, Canny edge extractor, etc.) to generate an edge map for the image frame. The edge map can, for example, include pixel values of one for edges and pixel values of zero for non-edges. The image sharpness module 312 can, for example, sum the pixel values to generate the sharpness metric for each image frame.

The image noise module 313 determines a noise metric for each image frame in the plurality of image frames. The noise metric is indicative of random variations in brightness or color in the image frame.

The image jitter module 314 determines a jitter metric for each image frame in the plurality of image frames. The jitter metric is indicative of spatial shifts between the image frame and other image frames in the plurality of image frames. The image jitter module 314 can, for example, utilize frame registration to measure the spatial shifts between image frames due to unintended motion. The image jitter module 314 can, for example, utilize a Fitts algorithm, correlation, and/or any other type of jitter processing technique to determine the jitter metric. The image jitter module 314 can, for example, utilize a Kalman filter to measure the spatial shifts between image frames due to intended motion (e.g., image pan commands, image zoom commands, etc.).

The image frame integration module 315 integrates the one or more image frames of the plurality of image frames based on input received from the communication module 311, image sharpness module 312, image noise module 313, and the image jitter module 314.

In particular, the image frame integration module 315 receives, for each pixel in at least one image frame of the plurality of image frames, a value representative of a sensor measurement. For example, sensor measurements from each pixel can include the difference in intensity between the pixel in the current frame and those from previous frames, after registering the frames to correct for the displacement of the input images. Additionally, statistical measurements are made and compared to thresholds indicating the persistence of the intensity differences over multiple frames. The combined information on intensity differences and their persistence is used to identify which pixels are in motion within the image. In general, frame integration causes moving objects to appear blurred or smeared. In order to prevent such blurring or smearing, the image integration module 315 detects whether or not motion exists in each of the pixels of each of the image frames. Once the image frame integration module 315 detects such motion, the image frame integration module 315 generates an integrated image frame wherein each pixel having detected motion is integrated by an amount less than that of those pixels for which motion is not detected. In an example, the amount of integration for those pixels for which motion is detected is based on contrast levels, expected rates of motion, and noise characteristics of sensor input image data. For instance, pixels that are determined to be in motion are integrated less than those that are determined to be stationary, reducing the motion blur on the pixels associated with moving objects, while still allowing the application of heavy integration and its associated noise reduction benefits on the otherwise stationary portions of the image.

Figure 4A:
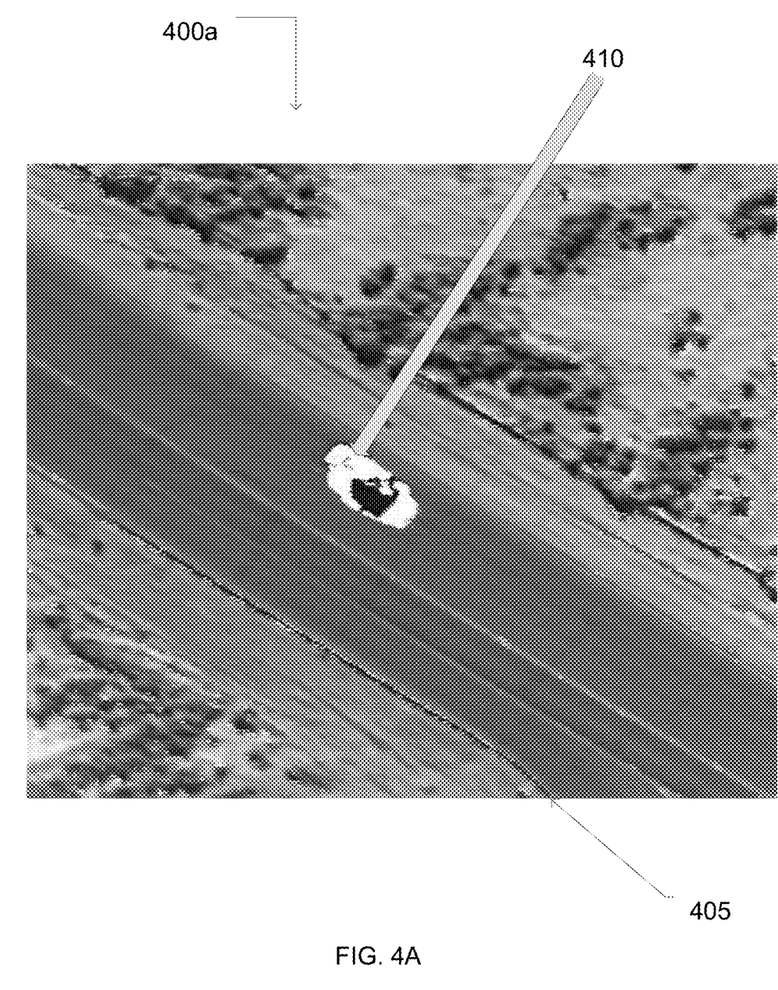
FIG. 4A illustrates an image frame n which certain pixels are erroneously identified as including motion in accordance with an example embodiment of the present disclosure.

In some situations, motion may be erroneously detected in some pixels. Such detection errors can be caused by, for example, misregistration of image frames, scale changes, rotations, perspective changes, and interlace effects. FIG. 4A illustrates an image frame 400a in which certain pixels are erroneously identified as including motion. In particular, the white pixels of the image frame 400a are pixels for which motion is detected. For example, the white color of pixels 405 along the lower edge of the depicted road indicates that the pixels 405a include motion. However, such an indication is clearly erroneous because the pixels 405a do not include an object in motion. In contrast, pixels 410 include an object in motion (e.g., a vehicle). An indication that the pixels 410 include motion is accurate.

Referring back to FIG. 3, the image frame integration module 315 reduces erroneous detection of motion by using an averaging metric to track pixel difference over multiple frames. In an example, the image frame integration module 315 uses registered frame differencing to detect motion. For instance, the image frame integration module 315 calculates an average difference of the value representative of the sensor measurement of the plurality of images or a subset of the plurality of images. The image frame integration module 315 can calculate the average difference by normalizing a difference of the value representative of the sensor measurement of a pixel of the plurality of image frames by performing a mean absolute deviation calculation of at least one pixel between at least two image frames of the plurality of image frames.

Figure 4B:
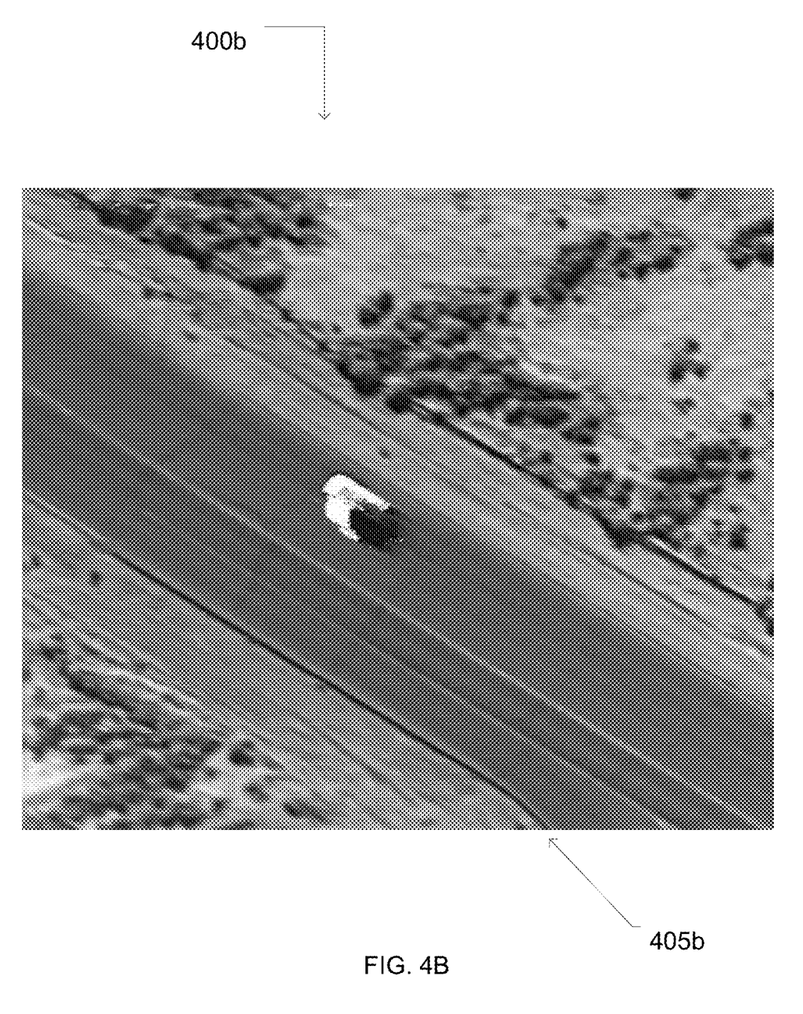
FIG. 4B illustrates an image frame for which erroneous detections of motion is removed by using an averaging metric in accordance with an example embodiment of the present disclosure.

FIG. 4B illustrates an image frame 400b for which erroneous detections of motion is removed by using the averaging metric. In particular, the erroneous detection of motion in pixels 405 is no longer present.

Referring back to FIG. 3, the image frame integration module 315 detects motion in a pixel of an image frame if the average difference of the value representative of the sensor measurement is greater than a scale factor times the average difference and the average difference is greater than a noise threshold. The scale factor is based on a statistical dispersion of data resulting from normalizing the difference of the value representative of the sensor measurement of a pixel of the plurality of image frames and sensor noise, registration accuracy, and changes in the image from frame-to-frame such as rotation, scale and perspective. The noise threshold is based on measured image noise and a type of sensor providing the sensor measurement.

Figure 5A:
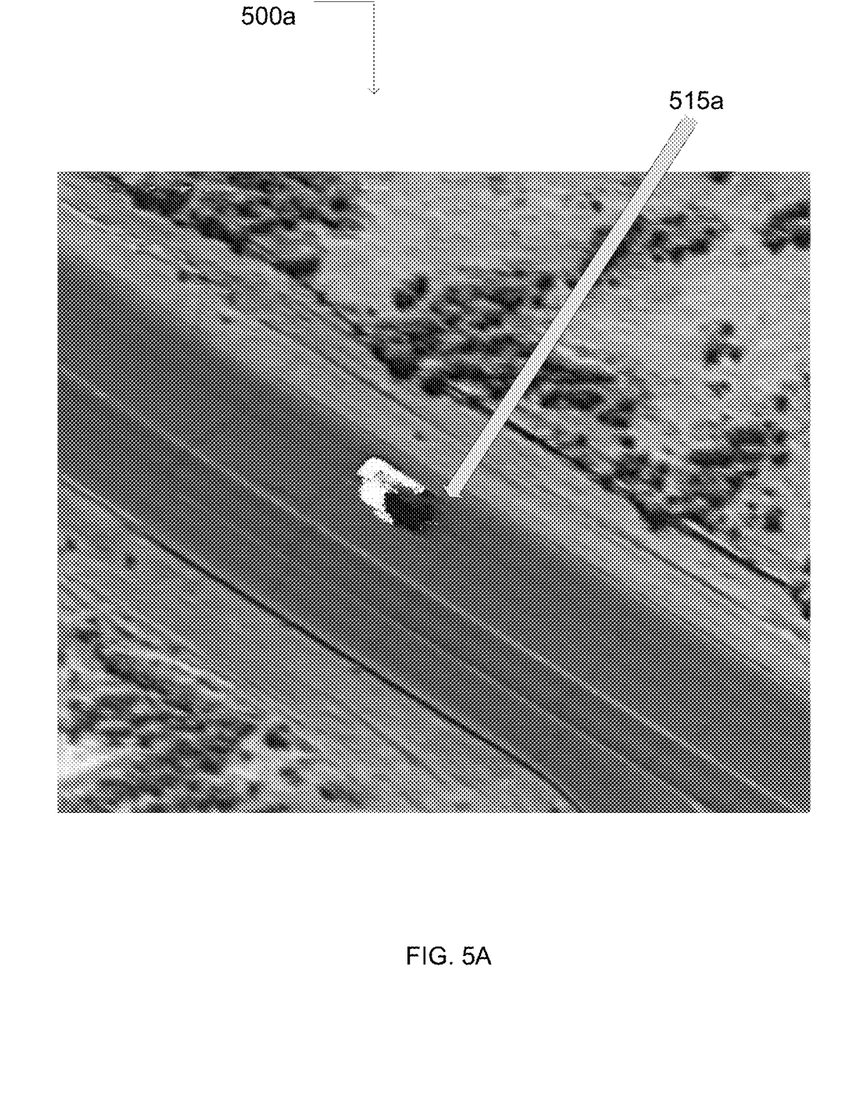
FIG. 5A illustrates an image frame that includes a blurred trailing end of a moving object in accordance with an example embodiment of the present disclosure.
Figure 5B:
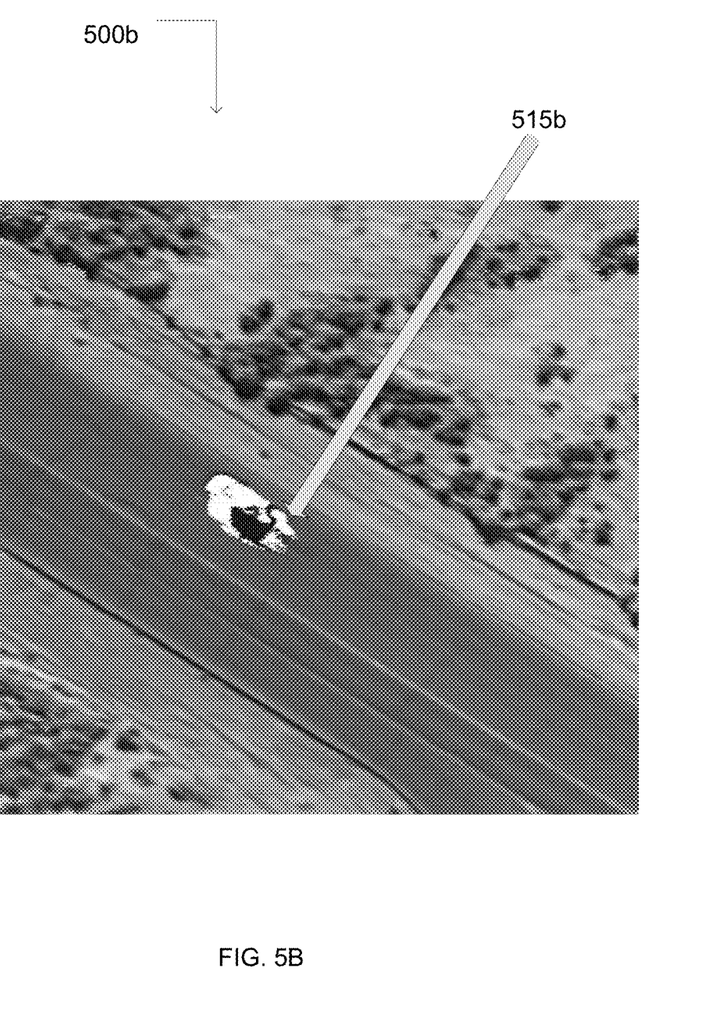
FIG. 5B illustrates an image frame utilizes a persistent count to assist in identifying movement in a trailing end of the moving object in accordance with an example embodiment of the present disclosure.

For moving objects, a trailing end of the moving object tends to blur. This occurs because the average difference of the value representative of the sensor measurements for pixels corresponding to the trailing end increases as the moving object reveals the background stationary image. This effect causes the pixels at the trailing end of a moving object to be misidentified as pixels associated with motion. FIG. 5A illustrates an image frame 500a that includes a blurred trailing end 515a of a moving object. In order to compensate for such blurring, the image frame integration module 315 assigns a persistent count for each pixel for which motion is detected. In particular, the persistent is set when the average difference is greater than the noise threshold and greater than a scale factor times the average difference. The persistent count is based on a typical vehicle's size and speed, and range of an image sensor to the target (e.g., the vehicle). FIG. 5B illustrates an image frame 500b. As illustrated, the image frame integration module 315 utilizes the persistent count to assist in identifying movement in a trailing end of the moving object (i.e., pixels which are white).

In addition, the image frame integration module 315 can also utilize a noise filter to further reduce false detections of movement. In particular, the image frame integration module 315 assumes that a true moving object should be made up of a cluster of moving pixels. Thus, for each pixel that is identified as including motion, the image frame integration module 315 determines if a certain percentage of pixels within a predetermined region (e.g., a 9×9 pixel region) around the pixel identified as including motion also include motion. The percentage of pixels is predetermined based on image and sensor characteristics, and the actual percentage is tuned for each application.

In some situations, lower contrast pixels in an image frame corresponding to a moving object may not be identified as including motion when the pixel difference calculations may not exceed the input sensor noise level thresholds. In order to prevent such a situation, the image frame integration module 315 utilizing a morphological spreading filter. As stated above, the image frame integration module 315 assumes that a true moving object should not be a collection of disconnected discrete pixels, and should be made up of a cluster of pixels for which motion is detected. This spreading filter is applied to fill in and extend the group of motion pixels associated with the moving object and create a uniform motion mask defining the boundaries of the moving object within the frame.

Figure 6A:
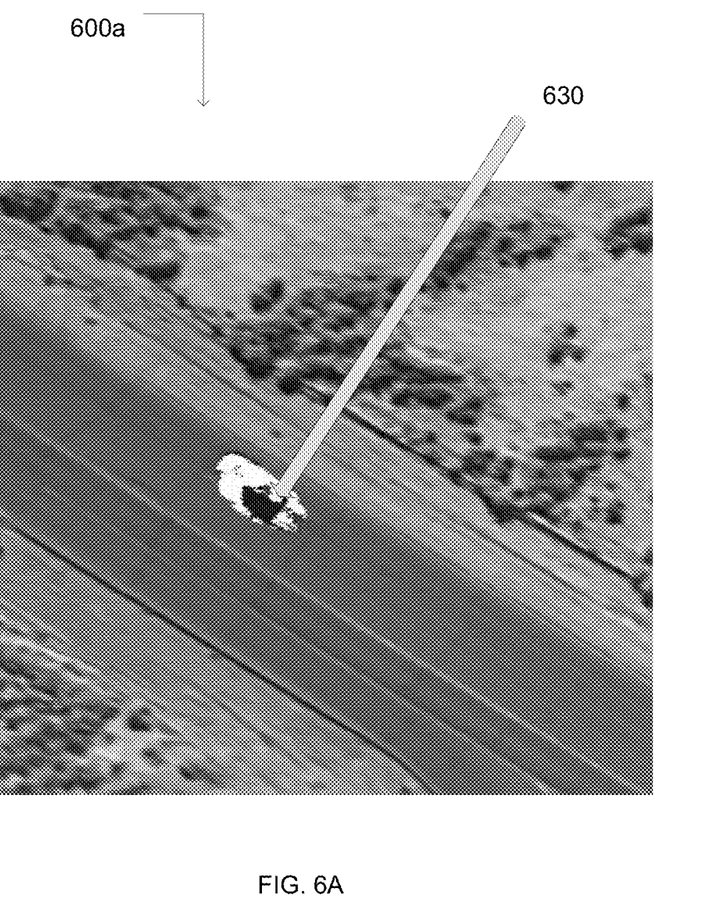
FIG. 6A illustrates an image frame that includes a group of low contrast pixels corresponding to a moving object for which motion is not detected in accordance with an example embodiment of the present disclosure.
Figure 6B:
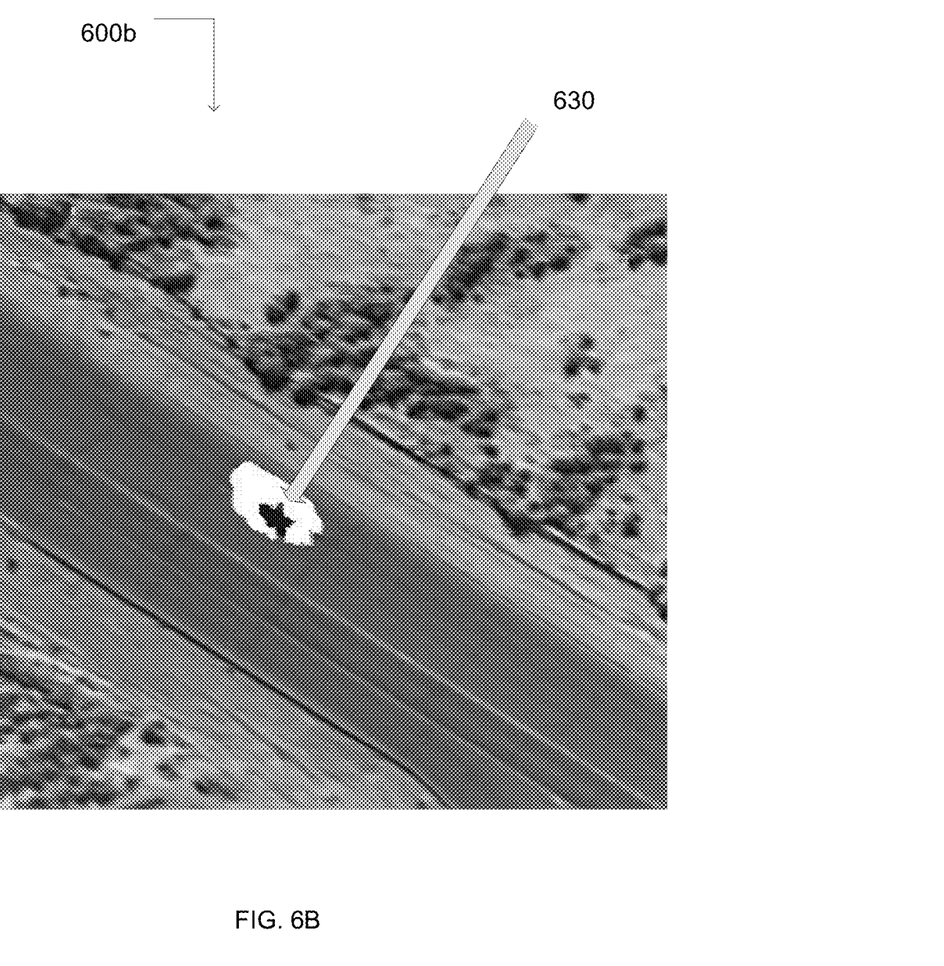
FIG. 6B illustrates an image frame that correctly identifies motion in the low contrast pixels in accordance with an example embodiment of the present disclosure.

FIG. 6A illustrates an image frame 600a that includes a group of low contrast pixels 630 corresponding to a moving object for which motion is not detected (e.g., the pixels are not white and are in grayscale). In order to prevent such a scenario, the image frame integration module 315 utilizing a morphological spreading filter to correctly identify movement in such pixels. FIG. 6B illustrates an image frame 600b that correctly identifies motion in the low contrast pixels 630. The image frame integration module 315 then integrates each pixel in each of the plurality of image frames by an amount based on whether the pixel includes motion.

Referring back to FIG. 3, the display device 393 displays information associated with the image system 310 (e.g., status information, configuration information, etc.). The processor 394 executes the operating system and/or any other computer executable instructions for the image system 310 (e.g., executes applications, etc.).

The memory 395 stores the images (e.g., actual image, processed image, etc.), the integrated image frames, and/or any other data associated with the image system 310. The memory 395 can store image information and/or any other data associated with the image system 310. The memory 395 can include a plurality of storage devices and/or the image system 310 can include a plurality of storage devices (e.g., an image storage device, an integrated image storage device, etc.). The memory 395 can include, for example, long-term storage (e.g., a hard drive, a tape storage device, flash memory, etc.), short-term storage (e.g., a random access memory, a graphics memory, etc.), and/or any other type of computer readable storage.

Figure 7:
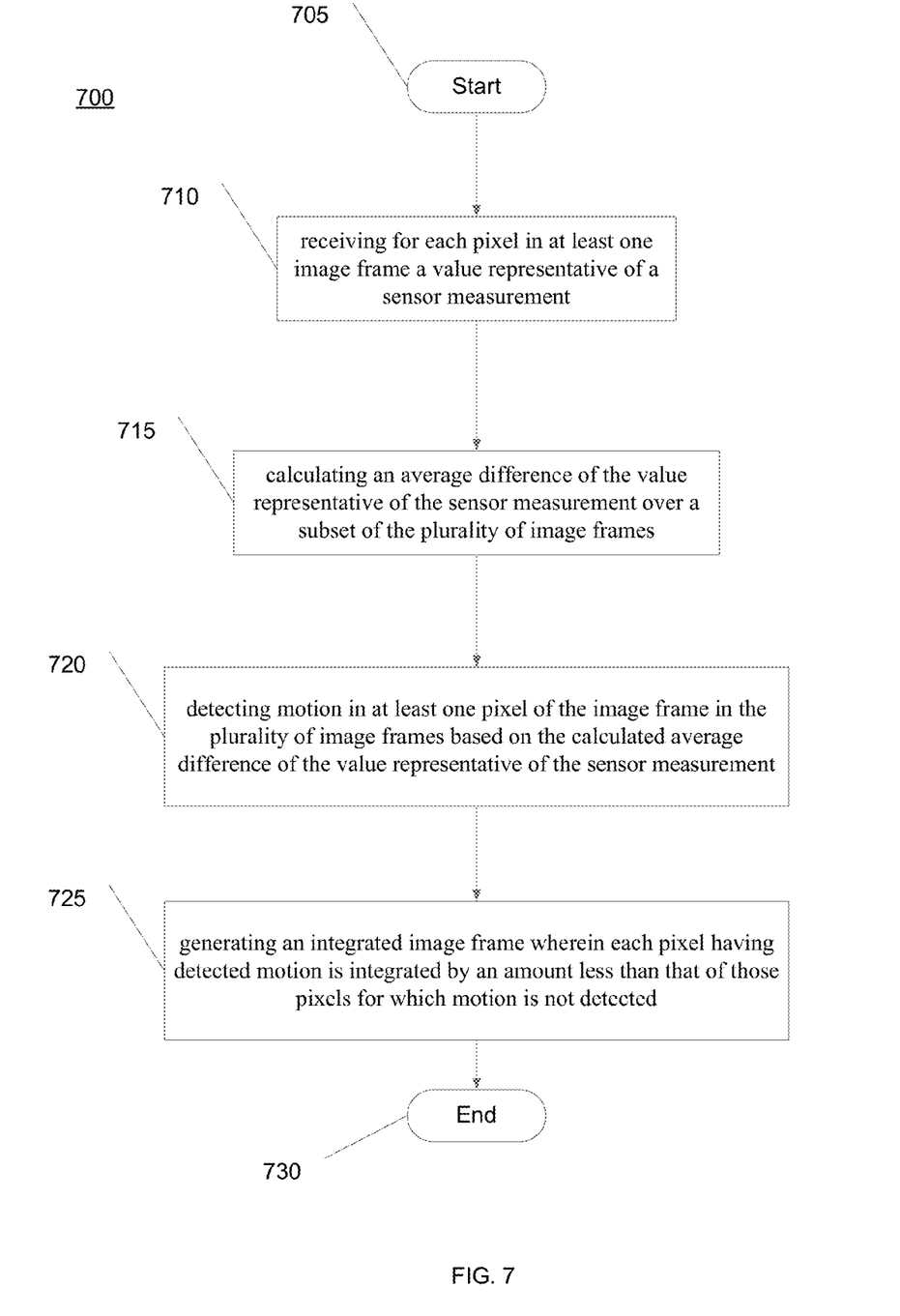
FIG. 7 is a flow diagram of a method for integrating image frames in accordance with an example embodiment of the present invention.

FIG. 7 is a flow diagram of a method 700 for integrating image frames in accordance with an example embodiment of the present invention. The method 700 begins at 705. At 710, the method includes receiving for each pixel in at least one image frame a value representative of a sensor measurement. Also, at 715, the method includes calculating an average difference of the value representative of the sensor measurement over a subset of the plurality of image frames. The method, at 720, includes detecting motion in at least one pixel of the image frame in the plurality of image frames based on the calculated average difference of the value representative of the sensor measurement over the subset of the plurality of image frames. The detected motion is of an object captured in the plurality of image frames. Further, at 725, the method includes generating an integrated image frame wherein each pixel having detected motion is integrated by an amount less than that of those pixels for which motion is not detected. The amount of frame integration is based on contrast levels, expected rates of motion, and noise characteristics of sensor input image data. At 730, the method ends.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

Further example embodiments of the present disclosure may be configured using a computer program product; for example, controls may be programmed in software for implementing example embodiments of the present disclosure. Further example embodiments of the present disclosure may include a non-transitory computer readable medium containing instruction that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the present disclosure.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the present disclosure by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the present disclosure may be embodied in other specific forms without departing from the spirit or essential characteristics thereof. The foregoing embodiments are therefore to be considered in all respects illustrative rather than limiting of the present disclosure described herein. Scope of the present disclosure is thus indicated by the appended claims, rather than by the foregoing description, and all changes that come within the meaning and range of equivalency of the claims are therefore intended to be embraced therein.

What is claimed is:

1. A method for integrating image frames, the method comprising:
   receiving for each pixel in at least one image frame in a plurality of image frames a value representative of a sensor measurement;
   calculating an average difference of the value representative of the sensor measurement over a subset of the plurality of image frames;
   detecting motion in at least one pixel of the at least one image frame in the plurality of image frames based on the calculated average difference of the value representative of the sensor measurement over the subset of the plurality of image frames, where the detected motion is of an object captured in the plurality of image frames; and
   generating an integrated image frame wherein each pixel having detected motion is integrated by an amount of frame integration less than that of those pixels for which motion is not detected, wherein the amount of frame integration is based on contrast levels, expected rates of motion, and noise characteristics of sensor input image data.

2. The method of claim 1 wherein calculating the average difference includes normalizing a difference of the value representative of the sensor measurement of a pixel of the plurality of image frames by performing a mean absolute deviation calculation of at least one pixel between at least two image frames of the plurality of image frames.

3. The method of claim 1 wherein detecting motion includes detecting initial motion in the at least one pixel of the image frame in the plurality of image frames if the average difference is greater than a scale factor times the average difference and the average difference is greater than a noise threshold.

4. The method of claim 3 wherein the scale factor is based on a statistical dispersion of data resulting from normalizing a difference of the value representative of the sensor measurement of at least one pixel between at least two image frames of the plurality of image frames and sensor noise, registration accuracy, and changes in the image from frame-to-frame such as rotation, scale and perspective.

5. The method of claim 3 wherein the noise threshold is based on measured image noise and a type of sensor providing the sensor measurement.

6. The method of claim 3 further comprising assigning a persistence count for each of the at least one pixel of the image frame for which initial motion is detected.

7. The method of claim 6 wherein the persistent count is based on a typical vehicle size and speed, and a range of an image sensor to a target.

8. The method of claim 1 further comprising reducing false detections of motions by applying a noise filter to each of the at least one pixel of the image frame for which motion is detected.

9. The method of claim 8 further comprising applying a morphological spreading filter to those pixels for which motion is still detected thereby obtaining an output.

10. The method of claim 9 further comprising thresholding the output of the morphological spreading filter, the thresholding providing a final identification of motion in the at least one pixel of the image frame in the plurality of image frames.

11. A system for integrating image frames, the system comprising:
    a memory;
    one or more processors; and
    an image integration module, using or including the one or more processors to execute computer executable instructions that cause the one or more processors to:
      receive for each pixel in at least one image frame in a plurality of image frames a value representative of a sensor measurement;
      calculate an average difference of the value representative of the sensor measurement over a subset of the plurality of image frames;
      detect motion in at least one pixel of the at least one image frame in the plurality of image frames based on the calculated average difference of the value representative of the sensor measurement over the subset of the plurality of image frames, where the detected motion is of an object captured in the plurality of image frames; and
      generate an integrated image frame wherein each pixel having detected motion is integrated by an amount of frame integration less than that of those pixels for which motion is not detected, wherein the amount of frame integration is based on contrast levels, expected rates of motion, and noise characteristics of sensor input image data.

12. The system of claim 11 wherein the image integration module, using or including the one or more processors, further causes the one or more processors to calculate the average difference by normalizing a difference of the value representative of the sensor measurement of a pixel of the plurality of image frames by performing a mean absolute deviation calculation of at least one pixel between at least two image frames of the plurality of image frames.

13. The system of claim 11 wherein the image integration module, using or including the one or more processors, further causes the one or more processors to detect initial motion in the at least one pixel of the image frame in the plurality of image frames if the average difference is greater than a scale factor times the average difference and the average difference is greater than a noise threshold.

14. The system of claim 13 wherein the scale factor is based on a statistical dispersion of data resulting from normalizing a difference of the value representative of the sensor measurement of at least one pixel between at least two image frames of the plurality of image frames and sensor noise, registration accuracy, and changes in the image from frame-to-frame such as rotation, scale and perspective.

15. The system of claim 13 wherein the noise threshold is based on measured image noise and a type of sensor providing the sensor measurement.

16. The system of claim 13 wherein the image integration module, using or including the one or more processors, further causes the one or more processors to assign a persistence count for each of the at least one pixel of the image frame for which initial motion is detected.

17. The system of claim 16 wherein the persistent count is based on a typical vehicle size and speed, and a range of an image sensor to a target.

18. The system of claim 11 wherein the image integration module, using or including the one or more processors, further causes the one or more processors to reduce false detections of motions by applying a noise filter to each of the at least one pixel of the image frame for which motion is detected.

19. The system of claim 18 wherein the image integration module, using or including the one or more processors, further causes the one or more processors to applying a morphological spreading filter to those pixels for which motion is still detected thereby obtaining an output.

20. The system of claim 19 wherein the image integration module, using or including the one or more processors, further causes the one or more processors to threshold the output of the morphological spreading filter, wherein results of the threshold provide a final identification of motion in the at least one pixel of the image frame in the plurality of image frames.

21. A non-transitory computer-readable medium having computer readable program codes embodied thereon for integrating image frames, the computer readable programs codes, including instructions that, when executed by one or more processors, cause the one or more processors to:

receive for each pixel in at least one image frame in a plurality of image frames a value representative of a sensor measurement;

calculate an average difference of the value representative of the sensor measurement over a subset of the plurality of image frames;

detect motion in at least one pixel of the at least one image frame in the plurality of image frames based on the calculated average difference of the value representative of the sensor measurement over the subset of the plurality of image frames, where the detected motion is of an object captured in the plurality of image frames; and generate an integrated image frame wherein each pixel having detected motion is integrated by an amount of frame integration less than that of those pixels for which motion is not detected, wherein the amount of frame integration is based on contrast levels, expected rates of motion, and noise characteristics of sensor input image data.

* * * * *